United States Patent [19]
Sasaki et al.

[11] Patent Number: 5,325,353
[45] Date of Patent: Jun. 28, 1994

[54] OPTICAL RECORDING MEDIUM

[75] Inventors: Koji Sasaki; Takashi Kishi, both of Miyagi, Japan

[73] Assignee: Sony Corporation, Tokyo, Japan

[21] Appl. No.: 82,433

[22] Filed: Jun. 28, 1993

Related U.S. Application Data

[63] Continuation of Ser. No. 701,114, May 16, 1991, abandoned.

[30] Foreign Application Priority Data

May 17, 1990 [JP] Japan .................. 2-127589

[51] Int. Cl.$^5$ .................................. G11B 7/24
[52] U.S. Cl. .................. 369/275.2; 369/275.1; 369/275.5; 369/279
[58] Field of Search .................. 369/275.1–275.5, 369/13, 277–279, 283, 284, 286; 360/59, 114, 131; 365/122

[56] References Cited

U.S. PATENT DOCUMENTS

| | | | |
|---|---|---|---|
| 4,569,881 | 2/1986 | Freese et al. | 369/13 |
| 4,931,336 | 6/1990 | Haneda | 369/277 |
| 5,107,486 | 4/1992 | Inui et al. | 369/275.4 |

FOREIGN PATENT DOCUMENTS

| | | | |
|---|---|---|---|
| 62-164237 | 7/1987 | Japan | 369/275.4 |
| 1-184736 | 7/1989 | Japan | 369/275.4 |
| 2-161632 | 6/1990 | Japan | 369/275.4 |

*Primary Examiner*—Hoa T. Nguyen
*Attorney, Agent, or Firm*—Hill, Steadman & Simpson

[57] ABSTRACT

An optical recording medium formed of a pre-grooved substrate provided with a recording layer formed on the groove, in which the groove has a shape to satisfy the condition $I_{Gr}/I_0 \geq 0.85$, where $I_0$ represents the reflected light quantity from the mirror surface and $I_{Gr}$ represents the reflected light quantity from the groove surface when the laser beam is concentrated to a spot size of approximately 1 μm on the surface of the medium, and to enable three-spot tracking to be performed. According to this invention, the CN ratio as the measure of noise in an optical recording medium can be improved.

5 Claims, 4 Drawing Sheets

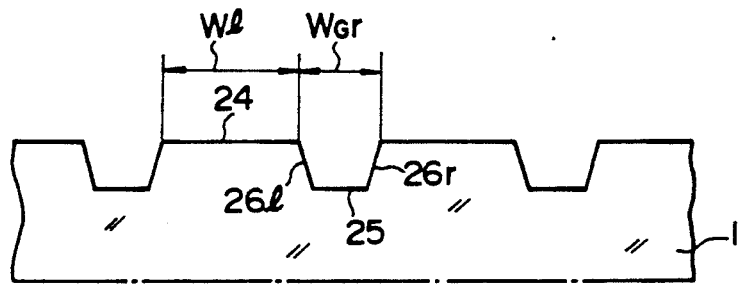
FIG. 6A
PRIOR ART
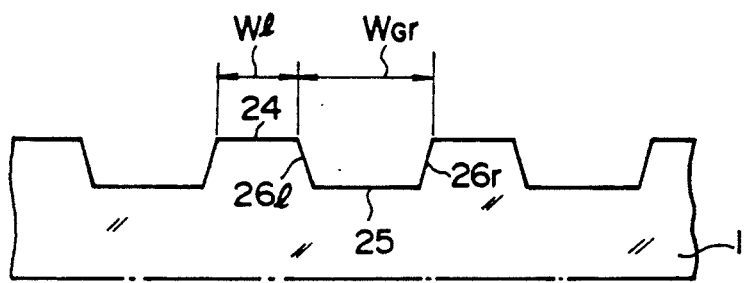
FIG. 6B
PRIOR ART
FIG. 7 PRIOR ART
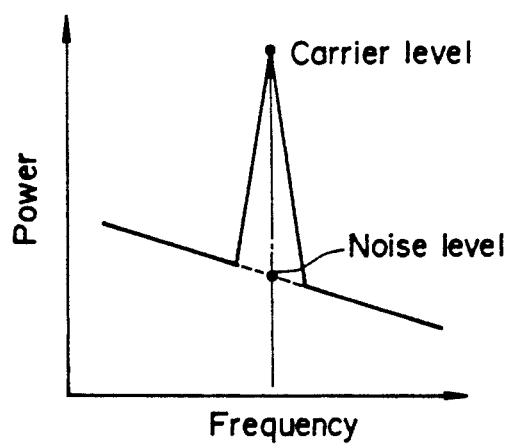

OPTICAL RECORDING MEDIUM

This is a continuation of application Ser. No. 07/701,114, filed May 16, 1991, now abandoned.

BACKGROUND OF THE INVENTION

1. Field of the Invention

The present invention relates to an optical recording medium and more particularly to an optical recording medium of a groove recording type in which record is made in a recording layer formed on a groove.

2. Description of Related Art

Optical disks in general (including those of a write once type and a rewritable type) are as shown in FIG. 5 provided with a spiral groove (pre-groove) 22 constituting a track made in the surface of a glass substrate 21 and with a recording layer 23 formed on the entire surface including the groove 22. Referring to FIG. 5, reference numeral 24 denotes a land surface and 25 denotes a groove surface. The optical disk has so narrow a track pitch P as 1.6 $\mu$m that it has ten times or above as high a recording density as that of magnetic disks (with a track pitch of 10 $\mu$m) which are frequently used today as a recording medium. Further, the optical disk having an access time of 50 msec or so provides an advantage to allow an extremely fast access thereto, and since it allows recording and reproduction of signals thereon in a noncontact manner, it has strong resistance to dust, scratch, or the like. Hence it presents an outstanding feature that the signal reproduced therefrom suffers no deterioration by mechanical causes even if it is subjected to many times of reproduction.

As the methods for recording signals in such optical disks, there are a land recording method and a groove recording method. An optical disk conventionally used for the land recording method has a width W1 of the land surface 24 of 1.0 $\mu$m and a width $W_{Gr}$ of the groove surface 25 of 0.6 $\mu$m, including the sloped surfaces 26*l* and 26*r* on the left and right, as shown in FIG. 6A. Thus, it has the groove surface 25 narrower than the land surface 24 and called a narrow-groove type. On the other hand, an optical disk conventionally used for the groove recording method has a width W1 of the land surface 24 of 0.6 $\mu$m and a width $W_{Gr}$ of the groove surface 25 of 1.0 $\mu$m as shown in FIG. 6A. Thus, it has the groove surface 25 wider than the land surface 24 and called a wide-groove type.

As a measure for evaluating noise in an optical disk, CN (carrier to noise) ratio is generally used. The CN ratio is the ratio of a carrier level to a noise level obtained as the result of a frequency spectrum analysis conducted, having data of a fixed frequency and a duty cycle of 50% recorded on an optical disk, in a 30-kHz resolution bandwidth of the entire frequency band of the reproduced waveform (refer to FIG. 7).

To improve the CN ratio of an optical disk, for example, of the groove recording type out of those for the above mentioned two recording types, it is required, when the optical disk is of a reflection type, to increase the quantity of reflected light of a laser beam 1 thrown on the groove surface 25 from the bottom surface of the glass substrate and bring it as close to the quantity of reflected light from the mirror surface (not shown) as possible. Representing the quantity of reflected beam from the groove surface 25 by $I_{Gr}$ and the quantity of reflected beam from the mirror surface by $I_0$, $I_{Gr}/I_0 = 0$-.7–0.8 was conventionally the achievable maximum value and, then, the CN ratio was around 48 dB.

SUMMARY OF THE INVENTION

The present invention was made in view of the above described point of problem. Accordingly, an object of the present invention is to provide an optical recording medium in which the CN ratio as the measure for evaluation of noise in the optical disk is improved.

According to the present invention there is provided an optical recording medium A formed of a substrate 1 with a pre-groove (groove 2) made therein provided with a recording layer 3 formed on the groove 9, in which the groove has a shape to satisfy the condition $I_{Gr}/I_0 \geq 0.85$, where $I_0$ represents the reflected light quantity from the mirror surface 11 and $I_{Gr}$ represents the reflected light quantity from the groove surface 9 when the laser beam is concentrated to a spot size of approximately 1 $\mu$m on the surface of the medium (groove surface 9), and to enable three-spot tracking to be performed.

By the above described arrangement of the present invention, the CN ratio in an optical recording medium A of the groove recording type can be improved without interfering with the tracking error detection by means of three-spot tracking.

BRIEF DESCRIPTION OF THE DRAWINGS

FIGS. A and 6B are a structural drawing schematically showing optical disks for use in different recording methods; and FIG. 7 is a characteristic diagram showing the CN ratio.

DESCRIPTION OF THE PREFERRED EMBODIMENT

An embodiment of the present invention will be described below with reference to FIG. 1 to FIG. 4.

Figures 1A, 1B:
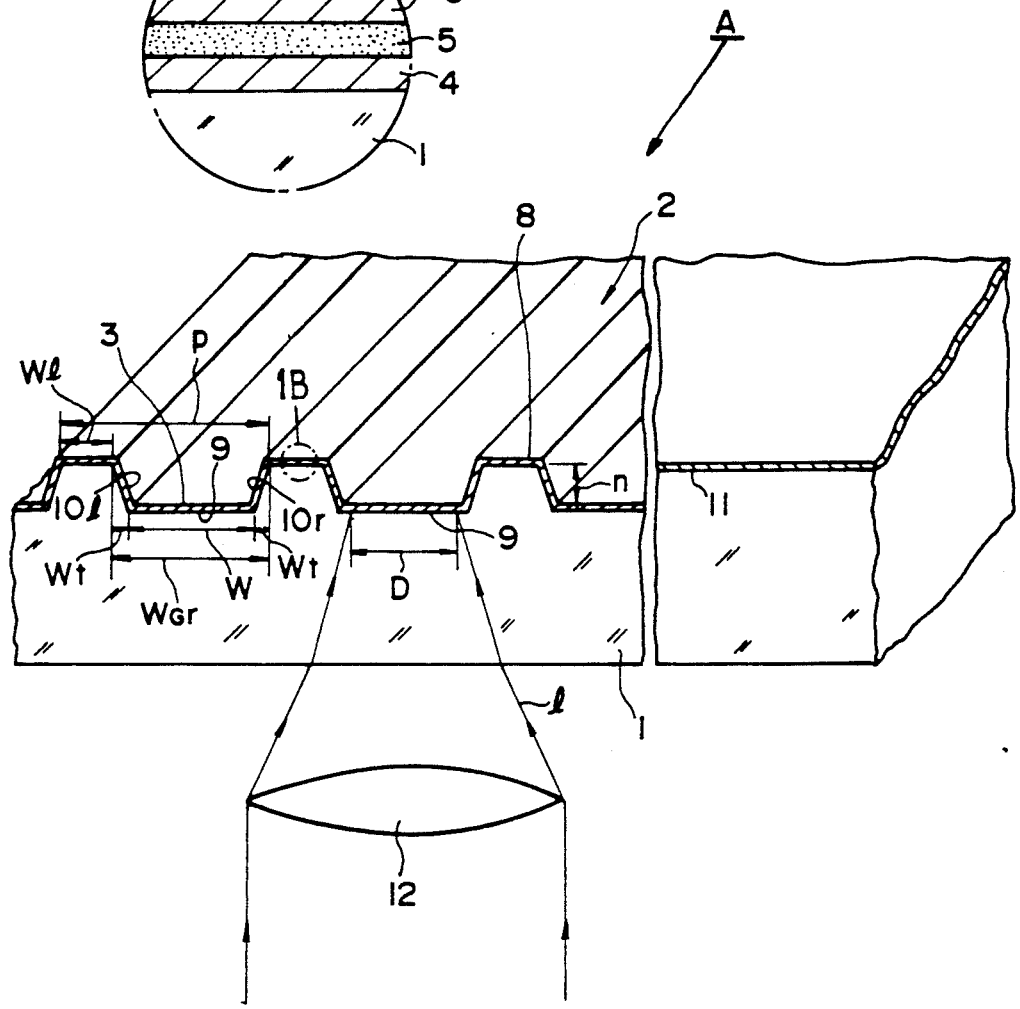
FIG. 1 is a structural drawing showing an optical disk according to the present embodiment.

FIG. 1 is a structural drawing showing an optical recording medium according to the present embodiment, or, more particularly, an optical disk (magneto-optic disk) A of a rewritable type.

The optical disk A is fabricated by making a spiral groove (i.e., pre-groove) 2 constituting a track in the surface of a glass substrate 1 and having a recording layer 3 formed on the entire surface including the groove 2 so as to fit the shape of the groove 2. The recording layer 3 is provided by depositing on the substrate 1 an SiN film 4, a vertical magnetization film (Mo film) 5, an SiN film 6, and an Al film 7 in succession. In FIG. 1, reference numeral 8 denotes a land surface and 9 denotes a groove surface.

In the present embodiment, the width $W_{Gr}$ of the groove surface 9 including the taper surfaces 10*l* and 10*r* on the left and right is set to be wider than that of the conventional type, i.e., for example, to 1.1–1.3 $\mu$m. In the illustrated example, the track pitch P is set to 1.6 $\mu$m, the width W1 of the land surface 8 is set to 0.4 $\mu$m approximately, and the width $W_{Gr}$ of the groove surface 9 is set to 1.2 μm approximately. The widths Wt of the taper surfaces 10*l* and 10*r* on the left and right are each set to 0.1 μm and, hence, the width W of the flat portion of the groove surface 9 is 1.0 μm approximately.

Figure 2:
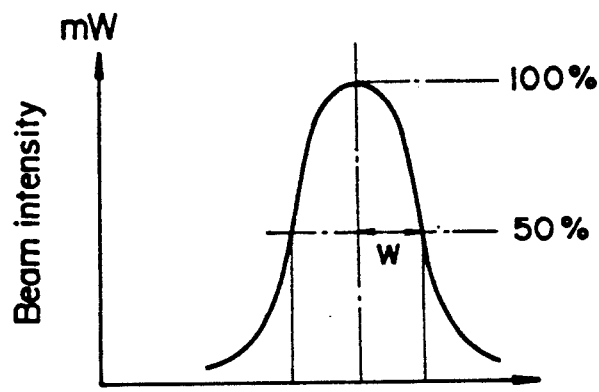
FIG. 2 is a characteristic diagram showing intensity distribution of the laser beam related to the present embodiment.

When the CN ratio of the optical disk A is to be measured, first, laser beams 1 each concentrated to a beam spot diameter D of approximately 1 μm on the groove surface 9 are thrown on the groove surface 9 and the mirror surface 11 and the quantities of light reflected from each of the surfaces 9 and 11 are measured. The mirror surface 11 is formed at the portion other than data areas, flag areas, and address areas. The laser beam 1, when its light intensity distribution is represented by the Gaussian distribution as shown in FIG. 2, the laser beam 1 is concentrated by an objective lens 12 so that the diameter 2W of the portion where the intensity is 50% of the intensity in the middle may become the spot diameter D. The spot diameter D in the present embodiment is set to approximately 1 μm as described above. Supposing that the above described laser beam 1 is thrown on the mirror surface 11 and the light quantity reflected from the mirror surface 11 is measured by a photosensor or the like, the measured signal quantity represented by $I_o$, and the reflected light quantity (signal quantity) $I_{Gr}$ from the groove surface 9 when the laser beam 1 is thrown on the groove surface 9, in the present embodiment, will have the relationship expressed as $$I_{Gr}/I_o \approx 0.85. \tag{1}$$

If the width $W_{Gr}$ of the groove surface 9 is widened to 1.3 μm (the width of the flat portion W=1.1 μm) the relationship will become as expressed as $$I_{Gr}/I_o \approx 0.95, \tag{2}$$

and the CN ratio will become 50 dB, or will be improved by 2 dB or so over that in the prior art example. This is because the sensitivity for reading on the groove surface 9 is improved by the reflected light quantity from the groove surface 9 brought closer to the reflected light quantity from the mirror surface 11, while noise components remain unchanged regardless of the increase in the reflected light quantity from the groove surface 9.

Figure 3:
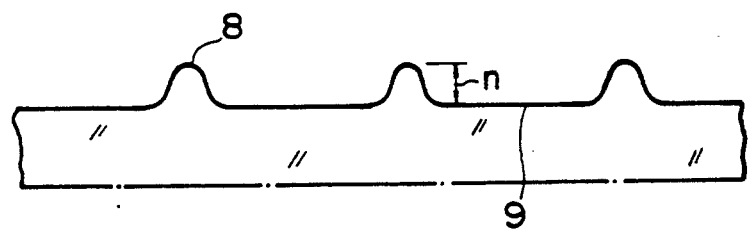
FIG. 3 is an explanatory drawing showing a form of the land surface.
Figure 4:
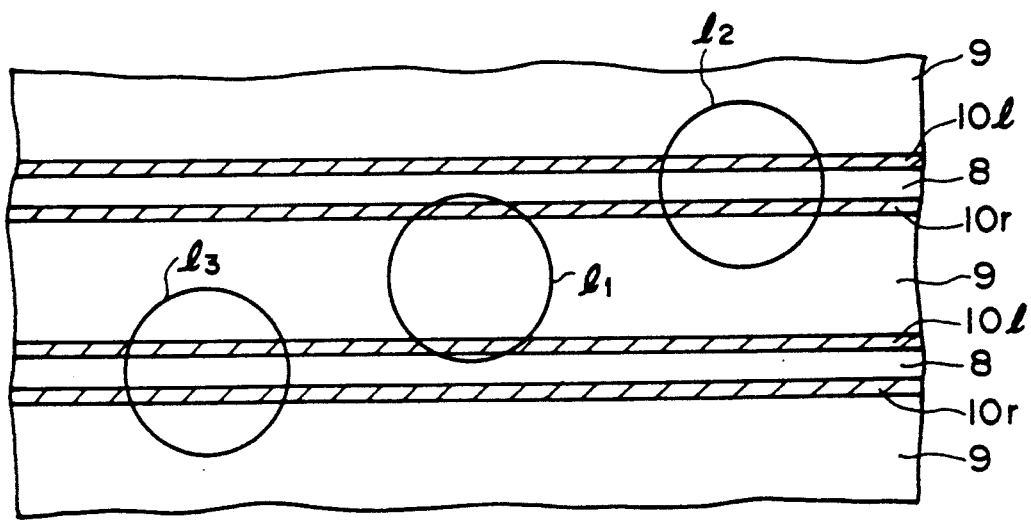
FIG. 4 is a plan view showing a three-spot tracking method (three-beam method)
Figure 5:
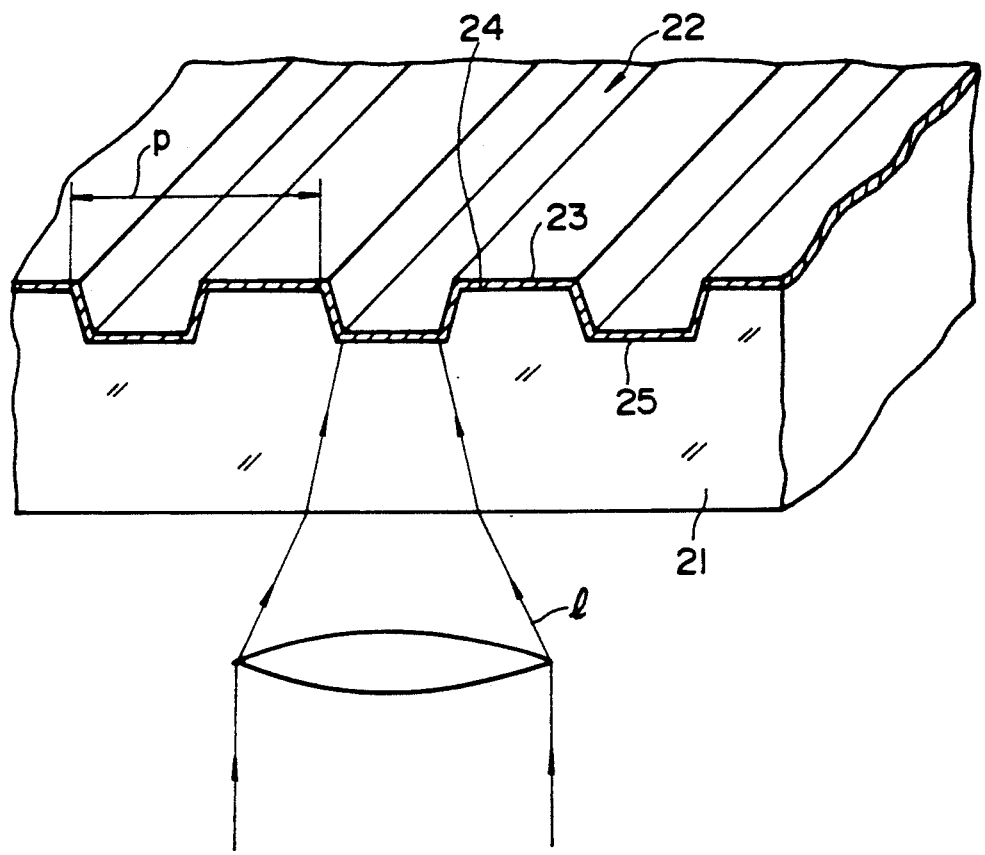
FIG. 5 is a structural drawing showing a prior art.

From the above, it can be presumed that the CN ratio will be improved according as the width $W_{Gr}$ of the groove surface 9 is widened. However, if the width $W_{Gr}$ of the groove surface 9 exceeds 1.3 μm, an adverse effect is produced on the beam-spot tracking at the time of signal reading and writing. More specifically, when the width $W_{Gr}$ of the groove surface 9 exceeds 1.3 μm, the width Wl of the land surface 8 becomes less than 0.3 μm and, then, in an actual optical disk A, the flat portion of the land surface 8 virtually disappears as shown in FIG. 3 and the distance n between the level of the groove surface 9 and the level of the land surface 8 becomes smaller. When, for example, a three-spot tracking method (i.e., three-beam method) as shown in FIG. 4 is used for detecting the tracking error on the optical disk A, if the distance n becomes smaller, the difference in the signal quantity between that obtained when the tracking is normal and that obtained when the tracking is abnormal decreases, and accordingly, a difficulty arises that the accuracy in detecting the tracking error signal is deteriorated.

When the land surface 8 has a flat portion as shown in FIG. 1, the distance n between the flat level of the land surface 8 and the flat level of the groove surface 9 is set to λ/4 (1000 Å in the present embodiment) so that the beams reflected or diffracted from the land surface 8 and the groove surface 9 interfere with each other and cancellation occurs. That is, the distance n is so selected that the reflected light quantity from the land surface 8 may become zero, and the difference between the reflected light quantity from the land surface 8 and the reflected light quantity from the groove surface 9 may become maximum.

When the distance n becomes smaller, the difference between the reflected light quantity from the groove surface 9 and the reflected light quantity from the land surface 8 becomes almost nil. When, for example, the spot diameter D of the laser beam 1 is set to 1.5 μm, the reflected light quantity of the main beam $l_1$ and the reflected light quantity of the sub-beam $l_2$ and $l_3$ become virtually equal and, hence, a sufficient signal quantity for tracking control becomes unavailable. Therefore, it is preferable that the width $W_{Gr}$ of the groove surface 9 is set to 1.1-1.3 μm as set in the present embodiment.

In order to improve accuracy in detecting the tracking error in the three-spot tracking control executed in the groove recording method as used in the present embodiment, two-division photodiodes (2D-PDs) may be disposed at the portions where the zero-order diffracted beams and the first-order diffracted beams of the main beam $l_1$ and the sub-beams $l_2$ and $l_3$ coincide so that changes in intensity distribution of the beam spots produced by interference due to unaligned tracking are detected as the tracking error signal.

According to the present embodiment as described above, the width $W_{Gr}$ of the groove surface 9 in the optical disk A of the groove recording type was set to 1.1-1.3 μm. Accordingly, when the laser beam 1 is concentrated to a spot size of approximately 1 μm on the groove surface 9, the relationship between the reflected light quantity (signal quantity) $I_0$ from the mirror surface 11 and the reflected light quantity (signal quantity) $I_{Gr}$ from the groove surface 9 comes to be expressed as $I_{Gr}/I_0 \geq 0.85$, that is, the reflected light quantity from the groove surface 9 is brought closer to the reflected light quantity from the mirror surface 11, so that the sensitivity in signal reading is bettered and a higher CN ratio can be obtained.

Although the optical disk A shown in the present embodiment was that of a rewritable type (magneto-optic disk), the same is also applicable to WORM type optical disks enabling to write once, rewritable optical disks using organic materials (such as photochromic materials), and the like.

Thus, the CN ratio as the measure for evaluation of noise in an optical recording medium can be improved by the optical recording medium according to the present invention.

What is claimed is:

1. An optical recording medium having a substrate with grooves thereon, said grooves having a recording layer formed thereon wherein each of said grooves has substantially flat bottom to satisfy the condition IGr/Io >/ 0.85, where Io represents the reflected light quantity from the mirror surface and IGr represents the reflected light quantity from groove surface when a laser beam is concentrated to a spot size of approximately 1 micrometer on the surface of the medium, and to enable three-spot tracking to be performed, wherein each of said grooves has a shape satisfying the condition IGr>/ILa where ILa represents the reflected light quantity from a land adjacent the groove.

2. An optical recording medium according to claim 1, wherein said recording layer is formed of an SiN film, a vertical magnetization film Mo film, an SiN film, and an Al film deposited on the groove in succession.

3. An optical recording medium according to claim 1, wherein said mirror surface is formed at the portion other than data areas, flag areas, and address areas.

4. An optical recording medium according to claim 1, wherein the width of the groove surface is most preferably set to 1.1–1.3 μm.

5. The optical recording medium according to claim 1, wherein said grooves constitute a spiral groove, said medium having a track pitch, and wherein the bottom of each of said grooves has a width in relation to a width of said track pitch in the ratio from 1.1/1.6 to 1.3/1.6.

* * * * *